United States Patent
Schubert et al.

(10) Patent No.: US 6,878,486 B2
(45) Date of Patent: Apr. 12, 2005

(54) SEAL FOR ELECTROCHEMICAL CELL

(75) Inventors: Mark A. Schubert, Brunswick, OH (US); Robert E. Ray, Jr., Strongsville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 497 days.

(21) Appl. No.: 10/033,830

(22) Filed: Dec. 20, 2001

(65) Prior Publication Data

US 2003/0118902 A1 Jun. 26, 2003

(51) Int. Cl.$^7$ ................................................ H01M 2/08
(52) U.S. Cl. ........................... 429/185; 429/53; 429/35; 429/181
(58) Field of Search ................... 429/53, 54, 35, 429/60, 163, 164, 180, 181, 185, 174, 57; 525/165, 185

(56) References Cited

U.S. PATENT DOCUMENTS

| | | | |
|---|---|---|---|
| 3,992,224 A | 11/1976 | Fielding et al. | 29/623.5 |
| 5,198,314 A * | 3/1993 | Gordy | 429/174 |
| 5,332,633 A | 7/1994 | Adamson et al. | 429/174 |
| 5,425,865 A | 6/1995 | Singleton et al. | 204/252 |
| 5,462,820 A | 10/1995 | Tanaka | 429/174 |
| 5,508,131 A | 4/1996 | Bowen et al. | 429/210 |
| 5,885,732 A | 3/1999 | Verhoog | 429/176 |
| 2001/0014419 A1 * | 8/2001 | Schubert | 429/185 |

FOREIGN PATENT DOCUMENTS

| | | | |
|---|---|---|---|
| GB | 2149198 | 6/1985 | ............ H01M/2/08 |
| JP | 53-050446 | 5/1978 | |
| JP | 56-032666 | 4/1981 | |
| JP | 57-084563 | 5/1982 | |
| JP | 63-202845 | 8/1988 | ............ H01M/2/08 |
| JP | 10-050278 | * 2/1998 | ............ H01M/2/08 |
| JP | 10050278 | 2/1998 | ............ H01M/2/08 |
| JP | 2001139797 | 5/2001 | ............ C08L/71/12 |
| WO | 00/39863 | 7/2000 | ............ H01M/2/08 |

* cited by examiner

Primary Examiner—Frankie L. Stinson
Assistant Examiner—Monique Wills
(74) Attorney, Agent, or Firm—Russell H. Toye, Jr.

(57) ABSTRACT

The invention is an injection-molded thermoplastic seal member for use in an electrochemical cell and a cell containing the seal member. The thermoplastic material comprises a mixture of a polyolefin matrix, comprising more than 30 weight percent of the thermoplastic material, and an aromatic polymer having a repeating unit that comprises at least one aromatic functional group. The material has excellent molding properties and results in a seal member that forms a superior compressive seal in the electrochemical cell.

48 Claims, 8 Drawing Sheets

| Property | Units | NORYL® Extend™ PPX7110 | NORYL® Extend™ PPX7125 | HIVALLOY® XPA047 | NORYL® PX-0844 | Nylon ZYTEL® 101 | Polypropylene PYROFAX® 6524 | AIM® 4800 | HIPS |
|---|---|---|---|---|---|---|---|---|---|
| Heat Deflection Temperature (dry as molded) 66 psi / 264 psi | deg F | 236 / 171 | 256 / --- | 264 / --- | 250 / 235 | 455 / 194 | 207 / --- | 205 / 200 | --- / 180 |
| Melt Viscosity (at molding temp. and shear rate 1000 sec⁻¹) | poise | 1700 (@ 500°F) | 1700 (@ 500°F) | | | 1300 (@ 550°F) | | | |
| Melt Flow Rate (at molding temp.) | g/10 min | 10.6 (@ 260C) | | 8 | < 4 | | 4 (@ 285 C) | | 7.5 |
| Coefficient of Thermal Expansion (in direction of flow) (73F, 50% RH) | in/in deg F | 0.000050 | | | 0.0000410 | 0.000065 | 0.0000540 | 0.000045 | |
| Tensile Modulus (23C, 50% RH) | psi | 195,000 | | | 325,000 | | 125,000 | 260,000 | 260,000 |
| Flexural Modulus (23C, 50% RH) | psi | 225,000 | | 625,000 | 325,000 | 175,000 | 250,000 | 270,000 | 260,000 |
| Yield Stress (Type I, 2.0 in/min) | psi | 5200 | | 9500 | 7200 | 8500 | 5100 | 3500 | 2700 |
| Tensile Elongation to Break | % | 195 | 150 | | 42 | 300 | 300 | 50 | 40 |
| Tensile Creep Deformation at Constant Load (1 hr to 1000 hrs; 114F; 1500 psi) | % dL/L | 2.50 | | 0.27 | | 2.90 | | | |
| Toughness (Izod Impact, notched, 73F) | ft-lb/in | 8.2 | 10.6 | 6.5 | 4.4 | 2.1 | 0.8 | 5.5 | 1.6 |
| Water Absorption (24 hours @ 73F) | % | < 0.1 | < 0.1 | 0.02 | 0.10 | 1.20 | 0.02 | | |

SEAL FOR ELECTROCHEMICAL CELL

BACKGROUND OF THE INVENTION

The present invention relates to an electrochemical cell (battery) with a metal container. More particularly, the present invention relates to seal members for sealing the active materials and electrolyte within the cell.

Many electrochemical cells have metal containers. The container may be in the form of a can, with a closed bottom end and an open top end, or in the form of a tube, open at both the top and the bottom. The open end(s) of the container may be closed with a cover (often called a cup in button cells). The cover may be attached directly to the edge of the container, e.g., by laser welding. However, it is common for a seal member, made of a thermoplastic material, to be disposed between the container side wall and the cover or cup to form a compressive seal.

The seal member in a typical primary cylindrical consumer alkaline battery also forms a seal around a current collector that extends through a central aperture in the seal member to make electrical contact between one of the electrodes inside the cell and an external contact terminal. Such thermoplastic seal members are popular in consumer batteries because they are relatively easy and inexpensive to manufacture, the cells are easy to assemble, and the resultant seal is acceptable for most consumer applications. Primary alkaline battery seal members may also include a pressure relief mechanism, such as a thinned or otherwise weakened section that will rupture or become displaced to release internal pressure from inside the cell and prevent bursting of the cell.

The seal member in a typical consumer button cell and in a typical consumer cylindrical lithium battery is a gasket in the form of an annular ring with an L-shaped or J-shaped cross section. A wall at the periphery of the gasket is located between the inner surface of the cell container (or can) and an outer surface or edge of the cell cover (or anode cup). The edge portion of the container is reduced in diameter and/or crimped inward and downward to compress the gasket wall between the container and the cover to seal the cell.

Battery manufacturers are continually trying to improve the seal members for electrochemical cells by improving on those characteristics that limit the seal members in some way. Electrochemical cells must remain sufficiently sealed over long periods of time and under a broad range of temperature and relative humidity conditions in order to have satisfactory shelf life and perform as expected after shipping and storage. For this reason, the material of the seal member must remain highly stable. Stress relaxation, creep, thermal stability, tensile modulus, flexural modulus and toughness are all characteristics that reflect aspects of the stability of thermoplastic materials, and some of these characteristics can be affected by temperature and/or humidity. Since the seal member is generally exposed directly to the internal environment of the cell, it must also be stable in that environment. This means it must not deteriorate in contact with the electrolyte or electrode materials. The rate of transmission of electrolyte solvents and certain other liquids and gases must be sufficiently slow to prevent excessive loss of electrolyte and wasteful corrosion reactions within the cell.

In order for a seal member to maintain a compressive seal against other cell components over a long period of time, it is desirable to minimize the rate of stress relaxation in the thermoplastic seal material. To reduce the rate of stress relaxation, fillers such as talc, calcium carbonate, carbon black, silica and the like have been added to the seal member material. However, even when this is done, the stress relaxation rate may still be higher than desirable. Mineral fillers also tend to be distributed non-uniformly after molding, which can lead to non-uniform seal member properties, defects and cell sealing deficiencies.

Some seal members perform additional functions. For example, some have rupture vents for releasing internal pressure from the cells. Some material characteristics will also affect how well the seal member performs these additional functions.

A common method of manufacture of thermoplastic seal members is injection molding. Some problems and limitations of such seal members are related to the injection molding process. For example, it is important that the material fill the mold cavities completely, without unintended voids, and uniformly, without creating weak weld lines. Weak weld lines are formed when surfaces of material filling a cavity meet but do not flow and melt together completely. The molded seal member preferably is uniform in density and other material characteristics. Molded parts may fracture at weak weld lines when the parts are put under tension. Molds can be designed and molding parameters can be adjusted to minimize weak weld lines and other problems related to filling of the mold cavities, but the characteristics of the material being molded also play a vital role in the quality and sealing characteristics of the molded parts.

A wide variety of materials are known as suitable for injection molded thermoplastic seal members for electrochemical cells. Polypropylene, polysulfone, and, in particular, nylon are popular for aqueous alkaline cells.

However, nylon has several major disadvantages. First, it absorbs moisture, making it necessary to dry the nylon prior to molding. After molding, the dimensions and properties of the resulting seal member are also affected by the tendency of nylon to absorb moisture.

Nylon is also subject to hydrolytic degradation when it comes in contact with aqueous alkaline electrolyte. Hydrolytic degradation of nylon occurs through chain scission of amide bonds. This chain scission embrittles the material, leading to seal failure and leakage from the cell. To help prevent this, protective coatings are often used on the surfaces of the seal member that can come in contact with the aqueous electrolyte. In particular, nylon seals for aqueous alkaline cells are generally provided with a coating of asphalt. Application of this asphalt coating involves additional process steps and materials, thus adding to the manufacturing cost of the seal member and the cell.

Another problem with nylon seals for alkaline cells is that they have a relatively high ultimate elongation. For safety reasons, seal members for consumer alkaline cells larger than button cells are typically designed to provide controlled release of pressure in the event that the internal cell pressure increases beyond an acceptable limit. This is often achieved by forming the seal member with a relatively thin portion, which is designed to rupture if the internal pressure increases beyond an established limit. Sufficient space must be provided within the cell to allow the thin portion to extend and rupture. Under normal moisture conditions, nylon may extend to over 300% of its initial length. This high level of elongation requires large amounts of internal cell space, limiting the seal and cell design, and, therefore, the internal volume available for active materials.

Another disadvantage of nylon seal members for electrochemical cells is that the physical properties of the seal, e.g., its strength, are dependent upon the moisture content of the nylon. The moisture content is dependent upon the relative humidity of the environment in which the cell is stored. Accordingly, the vent pressure (i.e., the pressure at which the thin portion of the seal member ruptures) is undesirably dependent on relative humidity.

Seal members made of polypropylene can soften extensively at the high end of the temperature range at which consumer cells may be used (75–85° C.). This results in lower deflection temperatures under load and excessive stress relaxation in the compressive sealing zones of the seal, leading to electrolyte leakage and unreliable cell performance.

The use of polysulfone as a material for electrochemical seal members has been relatively limited due to its relatively high cost. Polysulfone also has a tendency to absorb moisture, and it must be dried to less than about 0.02% moisture before it can be injection molded into a seal member.

Figure 1:
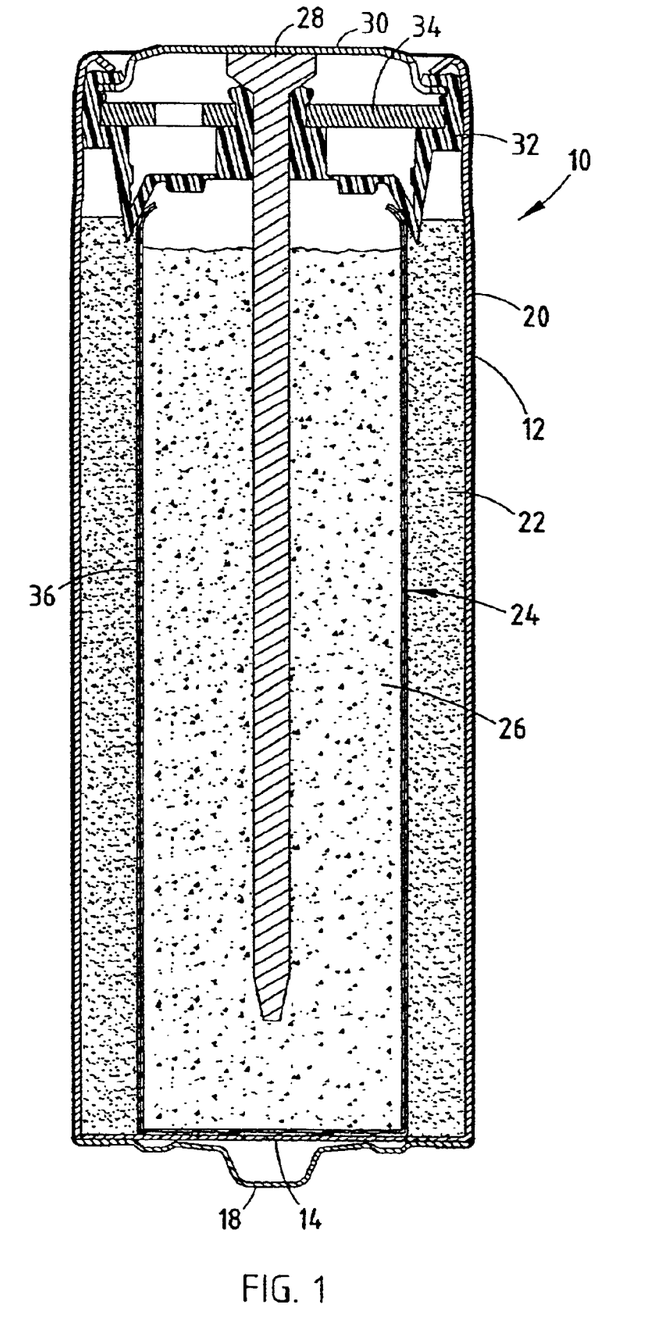
FIG. 1 is a cross-sectional view of a cylindrical alkaline zinc/manganese dioxide cell with a first alternative seal member design.

Other materials, alone and in various combinations are also known for making seal members for electrochemical cells. Many of these were developed to overcome problems or deficiencies with previously known materials. For example, U.S. Patent Application Publication No. 2001/0014419 A1 discloses a seal for a galvanic cell formed of a styrenic polymer blend including a styrenic polymer and an impact modifying agent which increases the toughness of the styrenic polymer. The disclosed seal has many advantages over conventional galvanic cell seals, including improved chemical resistance to alkaline medium, low water absorption, low coefficient of linear thermal expansion, good heat resistance at high pressures, quick cooling after molding, low melt viscosity, relatively low tensile strength, high impact toughness, relatively high heat deflection temperature, relatively low elongation to break, and high hydrogen permeability. However, even these seal members have shortcomings. While the melt viscosity of the disclosed impact modified styrenic polymer is relatively low, it is still higher than desirable. This can result in improper flow of material into the mold during injection molding, and, in the manufacture of seal members for conventional alkaline cells such as shown in FIG. 1, producing weak weld lines. While mold designs can be changed and molding parameters can be adjusted to minimize the formation of weld lines, there are practical limits in doing so, and such changes can create other problems and/or add to the cost of manufacturing the seal members. It may also be possible to modify the seal member material, e.g., by blending ingredients, but the number of possibilities for doing so are enormous.

Accordingly, an object of the present invention is a thermoplastic injection molded seal member for an electrochemical cell, the seal member being made from a material that has improved molding characteristics, resulting in improved quality, reduced dimensional variability, and lower manufacturing scrap.

A further object of the invention is a seal member with improved sealing characteristics when used in an electrochemical cell.

Another object of the invention is an electrochemical cell with improved shelf life, performance and reliability during manufacturing, shipment, storage and use of the cell.

SUMMARY OF THE INVENTION

An aspect of the invention is an electrochemical cell comprising a metal container with an open end; a negative electrode, a positive electrode and an electrolyte disposed within the container; and a seal member disposed in the open end of the container for closing the cell. The seal member, which seals the electrodes and the electrolyte within the container, comprises an injection-molded thermoplastic material. The thermoplastic material comprises a mixture of a polyolefin matrix, comprising more than 30 weight percent of the thermoplastic material, and an aromatic polymer, the aromatic polymer having a repeating unit that comprises at least one aromatic functional group.

Another aspect of the invention is an electrochemical cell comprising a container with an open end; a negative electrode, a positive electrode and an electrolyte disposed within the housing; and a seal member disposed in the open end of the container for closing the cell, thereby sealing the electrodes and the electrolyte within the container. The seal member comprises an injection-molded thermoplastic material, and the thermoplastic material comprises a mixture of a polyolefin matrix, comprising more than 30 weight percent of the thermoplastic material, and an aromatic polymer, having a repeating unit that comprises at least one aromatic functional group. The thermoplastic material has a heat deflection temperature at 66 psi (46.4 kg/cm$^2$), as determined by ASTM D648, of 200° F. to 400° F.

Another aspect of the invention is a seal member for an electrochemical cell. The seal member comprises an injection molded thermoplastic material comprising a mixture of a polyolefin matrix, the matrix comprising more than 30 weight percent of the thermoplastic material, and an aromatic polymer, the aromatic polymer having a repeating unit that comprises at least one aromatic functional group.

Yet another aspect of the invention is an electrochemical cell comprising a metal container and an injection-molded thermoplastic seal member forming a compressive seal. The seal member has the following properties:

(1) tensile creep deformation, between 1 and 1000 hours at 114° F. under a constant load of 1500 psi, of 0 to 3 percent, as determined by ASTM D2990;

(2) tensile modulus at 50% RH and 23° C. of 120,000 to 300,000 psi, as determined by ASTM D638;

(3) coefficient of thermal expansion in the direction of flow at 50% RH and 73° F. of 0.000020 to 0.000060 in./in.-° F., as determined by ASTM E831; and (4) heat deflection temperature, dry as molded, at 66 psi of 230° F. to 400° F.

DETAILED DESCRIPTION OF THE INVENTION

The inventors have discovered that the above objects, as well as others that will be obvious to one skilled in the art, are realized when the injection molded thermoplastic seal member of an electro chemical cell is made from a mixture comprising more than 30 weight percent of a polyolefin matrix and an aromatic polymer having a repeating unit with at least one aromatic functional group. In one embodiment the thermoplastic material has a heat deflection temperature at 66 psi (46.4 kg/cm$^2$) that is greater than 200° F.

The seal member of the invention is suitable for use in a typical electrochemical cell for a consumer alkaline battery, such as that illustrated in FIG. 1. This cell 10 has a can 12 with a closed bottom end 14. A positive electrode 22, with a cylindrical inner wall 36, is formed within can 12. A separator 24 and a negative electrode 26 are disposed within a central cavity in positive electrode 22. A seal assembly that includes a rigid metal cover 34 is disposed across the open end of the can 12. A current collector 28, in contact with the negative electrode 26, extends upward and outward to make electrical contact with the negative contact terminal 30. The seal assembly also includes seal member 32, which cooperates with cover 34 to close the open end of the cell, forming a compressive seal between can 12 and the periphery of cover 34. "Compressive seal" is a seal in which a force is directed against a surface of the seal member at an interface with another cell component, such that the sealing member has a compressive stress in at least one direction an area adjacent the seal interface. Seal member 32 also forms a seal between can 12 and the periphery of terminal 30. In addition to forming seals with can 12, seal member 32 also forms a seal around current collector 28 at a central hub. A thin coating of a sealant may also be put at any of the sealing interfaces of seal member 32, typically by applying the sealant to one or both of seal member 32 and a surface against which it forms a seal. The sealant fills in small recesses, scratches and other imperfections in the surfaces of seal member 32 and the components with which it forms a seal. The cell may then be finished by disposing a positive contact terminal 18 onto the can bottom 14 and affixing a jacket 20 to the outer surface of the side wall of can 12.

Figure 2:
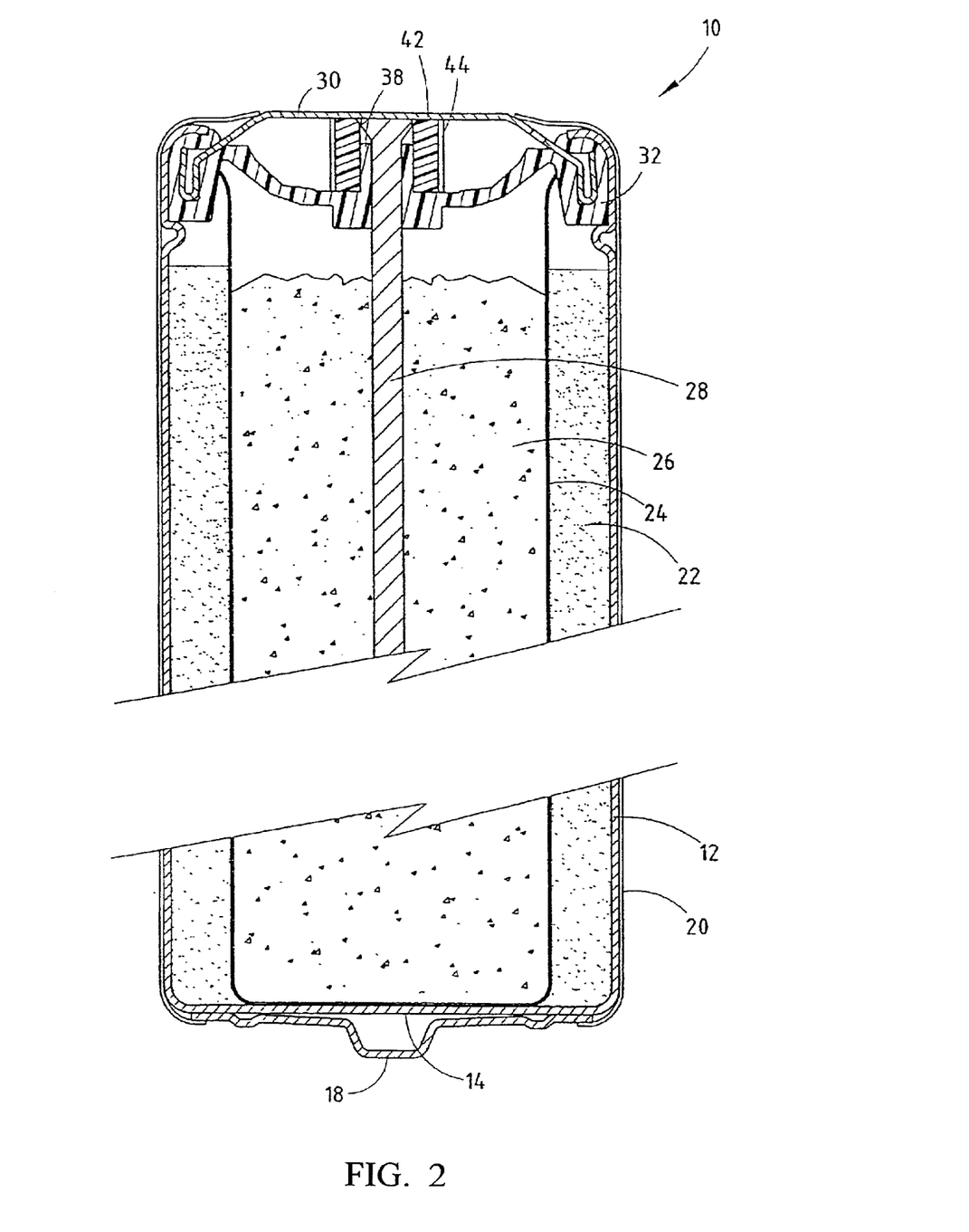
FIG. 2 is a cross-sectional view of a cylindrical alkaline zinc/manganese dioxide cell with a second alternative seal member design.

In the cell shown in FIG. 1, the central hub of seal member 32 around current collector 28 is supported by cover 34 to maintain compression of the hub. Another type of seal member design which can be used in consumer alkaline batteries is shown in FIG. 2. This design includes a bushing 42, rather than an inner cover, to support central hub 38 of seal member 32. Bushing 42 may include vertical grooves to assure proper operation of the pressure relief mechanism.

Figure 3:
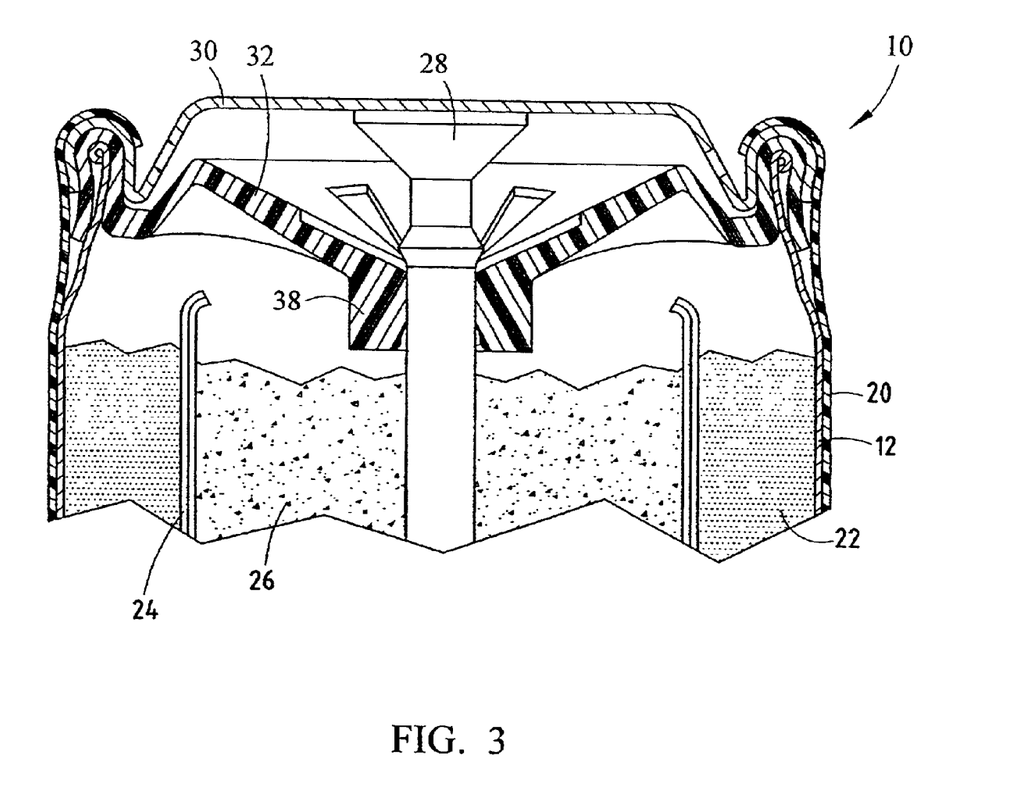
FIG. 3 is a cross-sectional view of a cylindrical alkaline zinc/manganese dioxide cell with a third alternative seal member design.

The seal member of the present invention is particularly advantageous in alkaline consumer cells in which the central hub of the seal member around the current collector is not supported by another component. An example of such a design is illustrated in FIG. 3. There is no support component such as an inner cover or bushing to provide support for seal member 32, and prior art seal member materials have been found unsuitable for such a seal design because of environmental stress cracking and loss of compressive seal due to excessive tensile creep.

While a preferred embodiment of the invention is a cylindrical primary cell with an aqueous alkaline electrolyte, the invention is not limited to such cells. The invention may also be practiced in cells and batteries of other electrochemical systems, configurations and sizes. The cells may be primary or rechargeable. They may have electrochemical systems of any type to which an injection molded thermoplastic seal member can be successfully adapted. Examples include aqueous systems with electrode couples such as zinc/manganese dioxide, zinc/silver oxide, zinc/mercuric oxide, zinc/air, nickel/cadmium, and nickel/metal hydride. Aqueous systems may have any suitable electrolyte that is compatible with the thermoplastic material. Examples include potassium hydroxide, sodium hydroxide, ammonium chloride and zinc chloride. Cylindrical cells and button cells are preferred cell designs, since thermoplastic seal members, especially those forming compression seals, are more easily adapted to a cylindrical opening and cover. However, the invention may also be used in cells having other shapes to which the seal member of the invention can be adapted. The invention can be used for cells with various arrangements of the electrodes inside the cell, including not only arrangements such as that shown in FIG. 1, but other bobbin-type arrangements, as well as cells with stacked electrode pellets or plates and cells with spiral wound electrodes.

Figure 4:
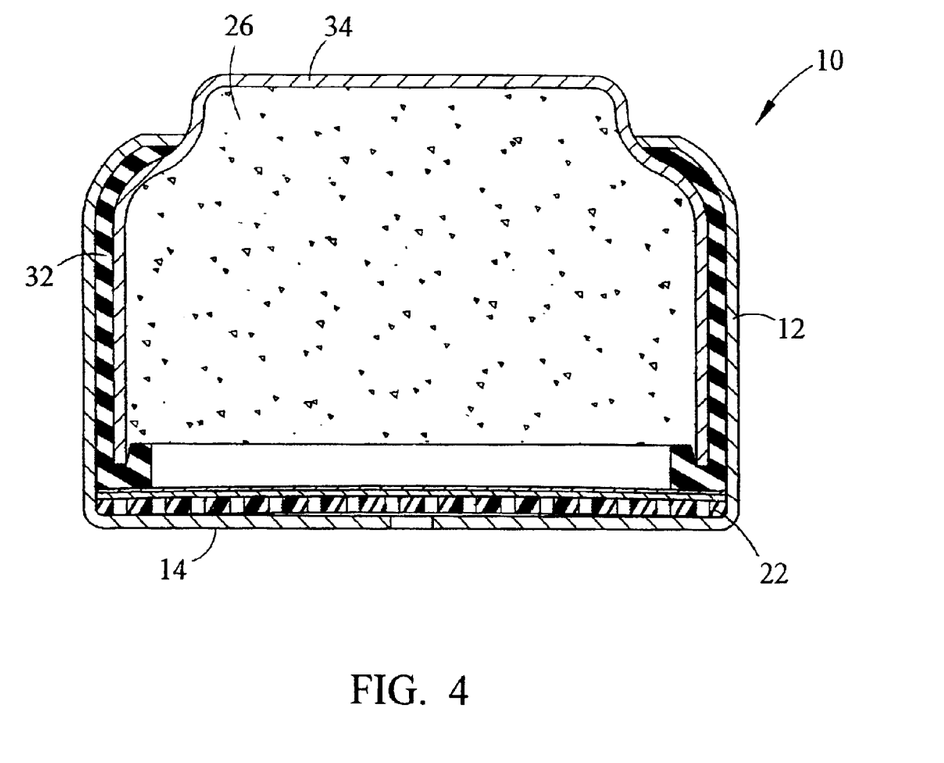
FIG. 4 is a cross-sectional view of a button cell.

FIG. 4 shows a common consumer button cell 10 in which a seal member 32 and a cover or anode cup 34, which also serves as the negative terminal, are disposed in the open end of can 12 to seal cell 10.

Figure 5:
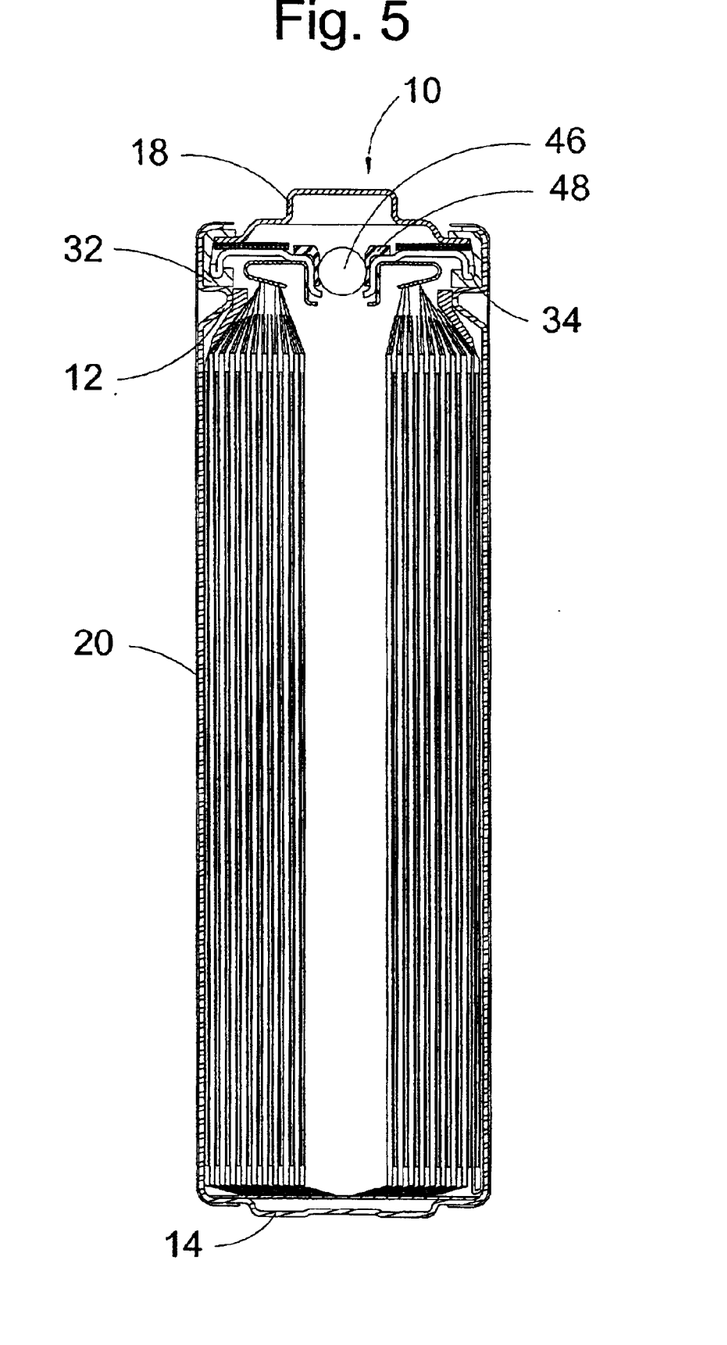
FIG. 5 is a cross-sectional view of a cylindrical lithium cell.

FIG. 5 shows a cylindrical cell 10 with a nonaqueous electrolyte. This cell has an inner cover 34 and seal member 32 disposed in the open end of can 12. Seal member 32 is compressed between the peripheral edge of cover 34 and the inner surface of can 12 to form a compressive seal. In this cell there is a separate pressure relief mechanism in the central portion of cover 34. This pressure relief mechanism includes a vent ball 46 and a vent bushing 48. Vent bushing 48 also functions as a seal member. The vent bushing may optionally be a seal member according to the present invention.

The design of the seal member itself may vary considerably. For example, it may essentially cover the entire open end of the cell container, as in FIGS. 1, 2 and 3, or it may be largely limited to the area between the top part of the can wall and the cover or cup wall, as in the cells in FIGS. 4 and 5. The greater the cross-sectional area at the narrowest section of the seal that is formed, the more important the rates of transmission of gases and liquids through the material. It may be desirable to design the seal member with a large cross-sectional area to facilitate transmission of undesired gases (e.g., hydrogen) that may be generated during storage, discharge or abuse in order to minimize the buildup of pressure inside the cell. In such designs, it is desirable that the transmission rates for gases and liquids to be kept inside or out of the cell be as low as practical, while the transmission rates for those to be passed through the seal member be as high as practical.

The design of the seal member may also be one that includes a pressure relief mechanism, such as that shown in FIG. 1. The specific materials used for the seal member will be selected in part based on the characteristics that are important for the proper functioning of the pressure relief mechanism.

The seal member of the invention is made from a mixture of materials that includes at least one polyolefin and at least one aromatic polymer having a repeating unit with at least one aromatic functional group. The mixture includes more than 30 weight percent polyolefin. Preferably the mixture contains at least 40 weight percent, more preferably at least 50 weight percent, polyolefin.

The polyolefin may be a polymer based on one or a combination of the following monomers: ethylene, propylene, 1-butene, 1-pentene, 1-hexene, 1-heptene, 1-octene, 1-decene, 1-octadecene, 3-methyl-1-butene, 3-methyl-1-pentene, 4-methyl-1-pentene, 4-methyl-1-hexene, 5-methyl-1-hexene, 5-methyl-1-heptene, vinylcyclohexane and vinylnaphthalene. Preferred polyolefins are polypropylene, polyethylene and polypropylene-ethylene copolymer, with polypropylene (e.g., PRO-FAX® 6524 from Basell Polyolefins, Wilmington, Del. USA) being most preferred.

The mixture comprises discrete phases of the aromatic polymer in a matrix of the polyolefin, as can be observed with the aid of transition electron microscopy (TEM).

An aromatic polymer is a polymer with a repeating unit that contains one or more types of aromatic functional groups. Examples of aromatic polymers that are suitable for use in the invention include poly(phenylene oxides), which have monomers such as 2,6-dimethyl-1,4-phenylene ether and 2,3,6-trimethyl-1,4-phenylene ether; aramids; polyketones, such as poly(ether ether ketone), poly(ether ketone), poly(ether ketone ketone) and poly(arylether ketone); polysulfones, such as polyether sulfones and polyaryl sulfones; polystyrenes, such as atactic polystyrene and syndiotactic polystyrene; polybenzimidazoles; polyimides; polybenzoxazinones; polybenzothiazoles; polybenzoxazoles; polybenzimidazoles; polyarylates; polyamide-imides; polyetheridmides; polyphenylene sulfides; polyphenyls; polyquinolines; and polyquinoxalines.

Polystyrenes are preferred aromatic polymers. Examples of polystyrenes include general purpose polystyrene (GPPS), which is an amorphous polymer with a heat deflection temperature at 66 psi (46.4 kg/cm$^2$) of about 95–105° C., and syndiotactic polystyrene (SPS), which is a semicrystalline thermoplastic polymer comprised of styrene monomer units arranged in a highly ordered alternating configuration along the polymer chain. The ordered structure of SPS allows the polymer chains to crystallize, improving the strength and heat resistance of the material near and above the heat deflection temperature. SPS, which is sold under the trade name QUESTRA® by Dow Chemical Company, Midland, Mich. USA, is a preferred polystyrene.

Poly(phenylene oxides) are also preferred aromatic polymers.

The aromatic polymer may be modified by blending with an impact modifier to reduce its brittleness and increase its impact toughness.

When the aromatic polymer comprises styrenic polymer, suitable impact modifiers include polyolefinic thermoplastic elastomers and triblock copolymers with an elastomeric block between two rigid thermoplastic blocks. Examples of polyolefinic thermoplastic elastomers include those polymerized from ethylene, octene, and butene monomer units and are copolymerized, such as in the presence of a metallocene catalyst, to produce saturated hydrocarbon rubbery materials. Triblock copolymers are preferred over polyolefinic thermoplastic elastomers. This is because the triblock copolymers have amorphous polystyrene blocks that provide improved miscibility in styrenic polymers such as SPS and GPPS. Preferred triblock copolymer impact modifiers include styrene-butadiene-styrene (S-B-S), styrene-isoprene-styrene (S-I-S), styrene-ethylene/butylene-styrene (S-EB-S) and styrene-ethylene/propylene-styrene (S-EP-S) block copolymers. S-EB-S and S-EP-S are more preferred because they do not contain any sites of unsaturation, so they are less susceptible to oxidative degradation.

A suitable impact modified styrenic polymer is high impact polystyrene (HIPS), which is produced by dissolving polybutadiene rubber in styrene monomer, using traditional catalysts. The result is an atactic amorphous phase, with styrene in a continuous phase around discrete polybutadiene phases with occlusions of polystyrene.

A preferred impact modified styrenic polymer is AIM® 4800, a super high impact polystyrene, sold by Dow Chemical Company of Midland, Mich. USA. This is a HIPS-like product with improved incorporation of the rubbery phase. AIM® 4800 differs from impact modified GPPS, impact modified SPS and conventional HIPS in that it has improved plastic deformation characteristics. It can undergo a yield and ductile deformation similar to nylon, allowing the material to experience higher strains before the seal member will crack.

When the aromatic polymer is a poly(phenylene oxide) (PPO), the impact modifier may be a styrene/polyolefin block copolymer. These block copolymers may be either diblock, triblock, or branched (radial) copolymers, with triblock copolymers being preferred. Styrene-butadiene (S-B), styrene-ethylene/butadiene (S-EB) and styrene-ethylene/propylene (S-EP) are examples of suitable diblock copolymers. Suitable radial copolymers include (styrene-butadiene)$_n$ and (styrene-isoprene)$_n$. Preferred triblock copolymers include S-B-S, S-I-S, S-EB-S and S-EP-S. The styrene/polyolefin block copolymer may be a pure or an oil-modified polymer. Such block copolymers are included among the KRATON® polymers, available from Kraton Polymers Business.

Preferably, a minimum amount of impact modifier necessary to achieve the desired properties in the seal member is used. For example, aromatic polymers are preferably modified by blending with impact modifier in a 1:99 to 10:90 impact modifier:aromatic polymer weight ratio.

The aromatic polymer may comprise a blend of polymers. A preferred blend comprises HIPS and PPO. Examples of such a blend include the NORYL® polymers, such as NORYL® EM6101, available from General Electric Co., Pittsfield, Mass. USA.

The thermoplastic material of the invention may optionally include a compatibilizer. A compatibilizer is a material that ties the polyolefin and aromatic polymer phases together to maintain the size, shape and distribution of the dispersed aromatic polymer in the polyolefin after injection molding of the seal member and throughout the useful life of the seal member and the cell in which it is used. Block copolymers are preferred compatibilizers. One end of a block is soluble in the polyolefin, and another end of a block is soluble in the aromatic polymer.

In order for the starting materials to process well during injection molding and form high quality seal members, the mixture of starting materials preferably has an overall melt viscosity at the molding temperature of less than 5000, more preferably less than 2000 poise, as determined by ASTM D3835 at a sheer rate of 1000 sec$^{-1}$. In general, the lower the overall melt viscosity the better, as long as excessive flashing does not occur during molding. The overall melt viscosity can be adjusted by selection of the components in the mixture and their relative quantities.

Melt flow rate, like melt viscosity, provides an indication of how easily the material will flow into the mold. The higher the flow rate value, the more readily it will flow during injection molding. For seal members of electrochemical cells, the melt flow rate at the molding temperature should be greater than 1 g/10 min., as determined by ASTM D3835. Preferably the melt flow rate is greater than 4 g/10 min. For molding characteristics that are substantially better than those of polypropylene, the melt flow rate should be at least 7, and preferably at least 9 g/10 min.

While nylon and polypropylene have overall melt viscosities and melt flow rates that are excellent for injection molding, seal members made from them have undesirable properties. HIPS and AIM® 4800 produce seal members with improved properties, but they have low tensile elongation to break. This leaves a narrow range of acceptable elongation. If the elongation is lower, the seal members will not have the desired level of desired stress, and higher elongation can result in seal member cracking. NORYL® PXO844 reduces crazing and cracking compared to HIPS and AIM®, but it has a melt flow rate that is lower than desired for good processing.

Other thermoplastic material properties that are important for seal members include tensile creep deformation, coefficient of thermal expansion, tensile modulus, yield stress, and heat deflection temperature.

The modulus (both tensile and flexural) of the material, in combination with the required percent compression of the seal member in the cell, will dictate how much variability can be tolerated in seal member and final sealed cell dimensions. The material must be soft enough that it can be sufficiently compressed when the cell is sealed, yet stiff enough (i.e., have a high enough modulus) to provide the required sealing stress over the entire range of seal member and assembled cell dimensional tolerances. For most commercial alkaline cell designs, the tensile modulus should be 100,000–400,000 psi (70,300–281,200 kg/cm$^2$), preferably 100,000–250,000 psi (70,300–175,750 kg/cm$^2$).

Elongation to break can also be important, especially for seal members that are designed to rupture to release internal pressure. Therefore, such seal members preferably have a tensile elongation to break, as determined by ASTM D638, of 20–350 percent, more preferably 30–200 percent. If the elongation to break is too high, the seal member will tend to stretch too much and not rupture reliably at the desired pressure. If the elongation to break is too low the seal member will tend to rupture prematurely.

Other properties that can be useful include: flexural modulus, toughness, and water absorption.

Test methods for determining the above properties and their preferred ranges are summarized in the table below.

TABLE

| Property | Test Method | Units | Preferred Range | More Pref. Range |
|---|---|---|---|---|
| Heat Deflection Temperature (dry as molded; 66 psi) | ASTM D648 | ° F. | 200–400 | 230–400 |
| Melt Viscosity (at molding temperature; shear rate 1000 sec$^{-1}$) | ASTM D3835 | poise | <5000 | <2000 |
| Melt Flow Rate (at molding temperature) | ASTM D1238 | g/10 min. | >4 | >7 |
| Coefficient of Thermal Expansion (50% RH and 73° F.) | ASTM E831 | in/in-° F. | 0.000010 to 0.00020 | 0.000020 to 0.000060 |
| Tensile Modulus (50% RH and 23° C.) | ASTM D638 | psi | 100,000 to 400,000 | 100,000 to 250,000 |
| Flexural Modulus (50% RH and 23° C.) | ASTM D790 | psi | 120,000 to 450,000 | 120,000 to 300,000 |
| Yield Stress (Type I, 2.0 in./min.) | ASTM D638 | psi | 1000 to 10,000 | 3000 to 8000 |
| Tensile Elongation to Break | ASTM D638 | % | 20–350 | 30–200 |
| Tensile Creep Deformation at Constant Load (1 to 1000 hrs.; 114° F.; 1500 psi) | ASTM D2990 | % dL/L | 0 to 3 | 0 to 1 |
| Toughness (Notched Izod Impact @ 73° F.) | ASTM D256 | ft-lb/in | >2 | >5 |
| Water Absorption (24 hrs. @ 73° F.) | ASTM D570 | % | <1 | <0.1 |

Suitable materials for injection molded thermoplastic seal members must process well and produce high quality seal members. Each material to be evaluated is used to injection mold seal members, making those adjustments to the molding parameters that are necessary to produce optimum parts. Feeding of the material can be observed, as well as the quality of the molded seal members (e.g., uniformity of the molded material, minimal dimensional variations, and absence of defects such as voids, occlusions, splits and charring).

For the injection molded thermoplastic seal member to be suitable for use in a particular type of electrochemical cell, it must be stable in the internal environment of the cell. Since the seal member can often come in direct contact with electrolyte in the cell, it may be desirable to screen possible materials for compatibility in a solution of electrolyte to be used in the cell. For example, for alkaline cells using an aqueous potassium hydroxide electrolyte, the following tests may be used; the skilled artisan can easily design other suitable tests for any electrolyte and/or electrochemical cell of interest. Minimal changes in weight, molecular weight and chemical composition are desirable.

Electrolyte Stability Test @ 130° C. Materials are tested for weight loss in 37 weight percent potassium hydroxide in water at 130° C. Tensile bars, ⅛ inch (3.175 mm) thick, of each material are weighed, then floated on the potassium hydroxide solution in a fluoropolymer vial and placed in an oven. The bars are periodically removed, rinsed, dried, and reweighed, replaced on the solution, and placed in the oven. The test may be continued for any desired duration; 30 to 40 days has been found to be useful. Because the bars are floated on the potassium hydroxide solution, they are in contact with both the solution and air during the test.

Electrolyte Stability Test @95° C. Materials are also tested for weight loss in 37% potassium hydroxide solution at 95° C. Microtensile bars ¹⁄₃₂ inch (0.794 mm) thick, with a 0.009 inch (0.229 mm) thick section, are submerged in potassium hydroxide solution in a fluoropolymer bottle and placed in an oven. The bars are periodically removed, rinsed, dried, reweighed, submerged in the solution, and replaced in the oven. The test may be continued for any desired duration; 30 to 40 days has been found to be useful. The purpose of the thinner section is to simulate the thin vent section in a seal with a diaphragm vent.

ATR-FTIR Test. Attenuated total reflectance-fourier transform infrared (ATR-FTIR) spectroscopy is used to evaluate any chemical changes at the surface of the specimens by testing the bars both before and after the weight loss tests.

GPC Test. Gel permeation chromatography (GPC) is used to further determine changes in the molecular weights of the specimens after exposure to the potassium hydroxide solutions. To concentrate on the exposed areas of the samples, shavings are taken from the surfaces of the bars. The results are compared to those from another set of bars that was not exposed to potassium hydroxide solution and high temperature.

For seal members to be used in aqueous alkaline cells, especially zinc/manganese dioxide cells with potassium hydroxide electrolyte, a preferred thermoplastic material for seal members to be used in aqueous alkaline cells contains a mixture of polypropylene and polystyrene. HIVALLOY® polymers, from Bassell Polyolefins, Wilmington, Del. USA, are examples of such materials. A more preferred thermoplastic material contains a mixture of polypropylene and an impact modified poly(phenylene oxide) (PPO). NORYL® EXTEND™ PPX7110 and PPX7125, from General Electric Co., are such materials.

Figure 6:
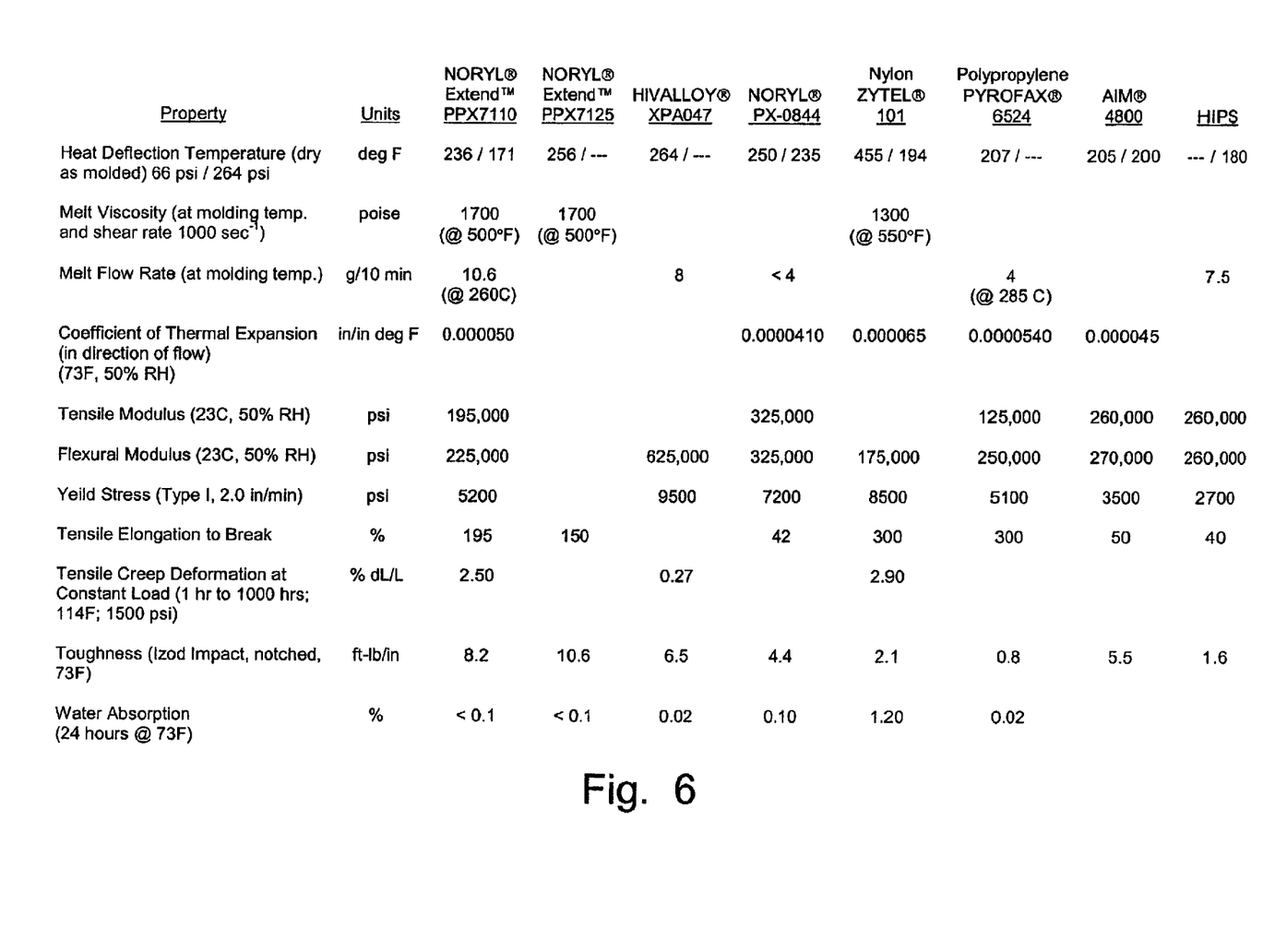
FIG. 6 is a table comparing characteristics of materials suitable for seal members of the invention with materials used for seal members of the prior art.

Key properties of several materials according to the invention are compared with properties of several prior art materials in FIG. 6.

In addition to evaluating seal member material properties, it is also desirable to test molded seal members in electrochemical cells. The tests used will depend upon the expectations and requirements for the cells. In the examples below, an accelerated shelf storage test is used. This test has been found to be useful in relatively quickly evaluating seal effectiveness in consumer alkaline cells during storage.

COMPARATIVE EXAMPLE 1

Conventional cylindrical alkaline $Zn/MnO_2$ LR6 cells with a design similar to that shown in FIG. 2 were assembled in a conventional manner. The positive electrodes contained electrolytic manganese dioxide as the active material, and expanded graphite as an electrically conductive agent. The negative electrodes contained zinc powder in a gelled aqueous potassium hydroxide electrolyte. The seal members were injection molded from nylon 6,6 (available from DuPont Engineering Polymers, Wilmington, Del. USA, as ZYTEL® 101).

Figure 7:
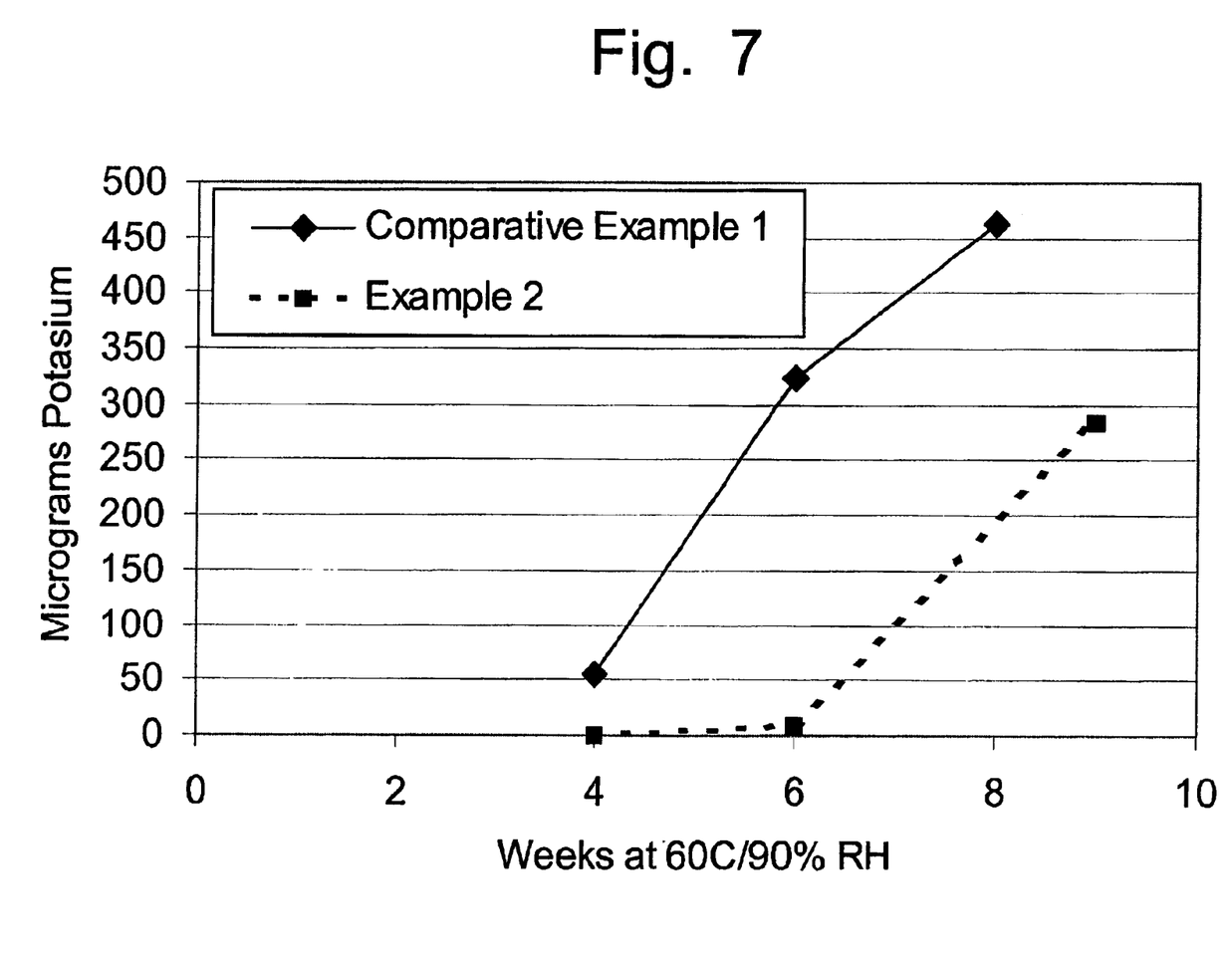
FIG. 7 is a graph of average potassium creepage from cells as a function of time on test.

After closing and sealing the cells with the nylon seal members, the cells were tested at high temperature and high humidity to determine the amount and rate of electrolyte creepage through the interfaces between the seal members and the cans and current collectors. The amount of potassium creepage was determined by rinsing the sealed ends of the cells with a fixed volume of deionized water, and the concentration of extracted potassium in the deionized water was measured using a selective ion meter, such as the Cardy Ion Meter, manufactured by Horiba Instruments. The concentration was then multiplied by the volume of deionized rinse water to determine the quantity of potassium. Five cells from each of 3 lots were measured each of a number of time periods on test. After 4 weeks the average amount of potassium that had crept through the seal was about 55 µg per cell. By 8 weeks the average had increased to about 463 µg. The test results are shown in FIG. 7.

EXAMPLE 2

Cells were made according to the invention in the same manner as the cells in Comparative Example 1, except that the seal members were injection molded from NORYL® Extend™7110. They were tested in the same manner as the cells in Comparative Example 1. As shown in FIG. 7, after 4 weeks on test there was no measurable potassium creepage from the cells, after 6 weeks the average was about 8 µg/cell, and at 9 weeks there was an average of 285 µg/cell. Substituting material according to the present invention for nylon 6,6 in the seal member resulted in a substantial improvement in the effectiveness of the cell seal.

COMPARATIVE EXAMPLE 3

Cylindrical alkaline $Zn/MnO_2$ LR6 cells with a design similar to that shown in FIG. 3 were assembled in a conventional manner. The positive electrodes contained electrolytic manganese dioxide as the active material, and expanded graphite as an electrically conductive agent. The negative electrodes contained zinc powder in a gelled aqueous potassium hydroxide electrolyte. The seal members were injection molded from nylon 6,6 (available from DuPont Engineering Polymers, Wilmington, Del. USA, as ZYTEL® 101).

After closing and sealing the cells with the nylon seal members, the cells were tested at high temperature and high humidity to determine the amount and rate of electrolyte creepage, as described in Comparative Example 1. Within 2 weeks of storage at 60° C. and 90% RH the seal members had cracked at the hubs, resulting in copious leakage (the quantity was not measured), and the test was stopped.

EXAMPLE 4

Figure 8:
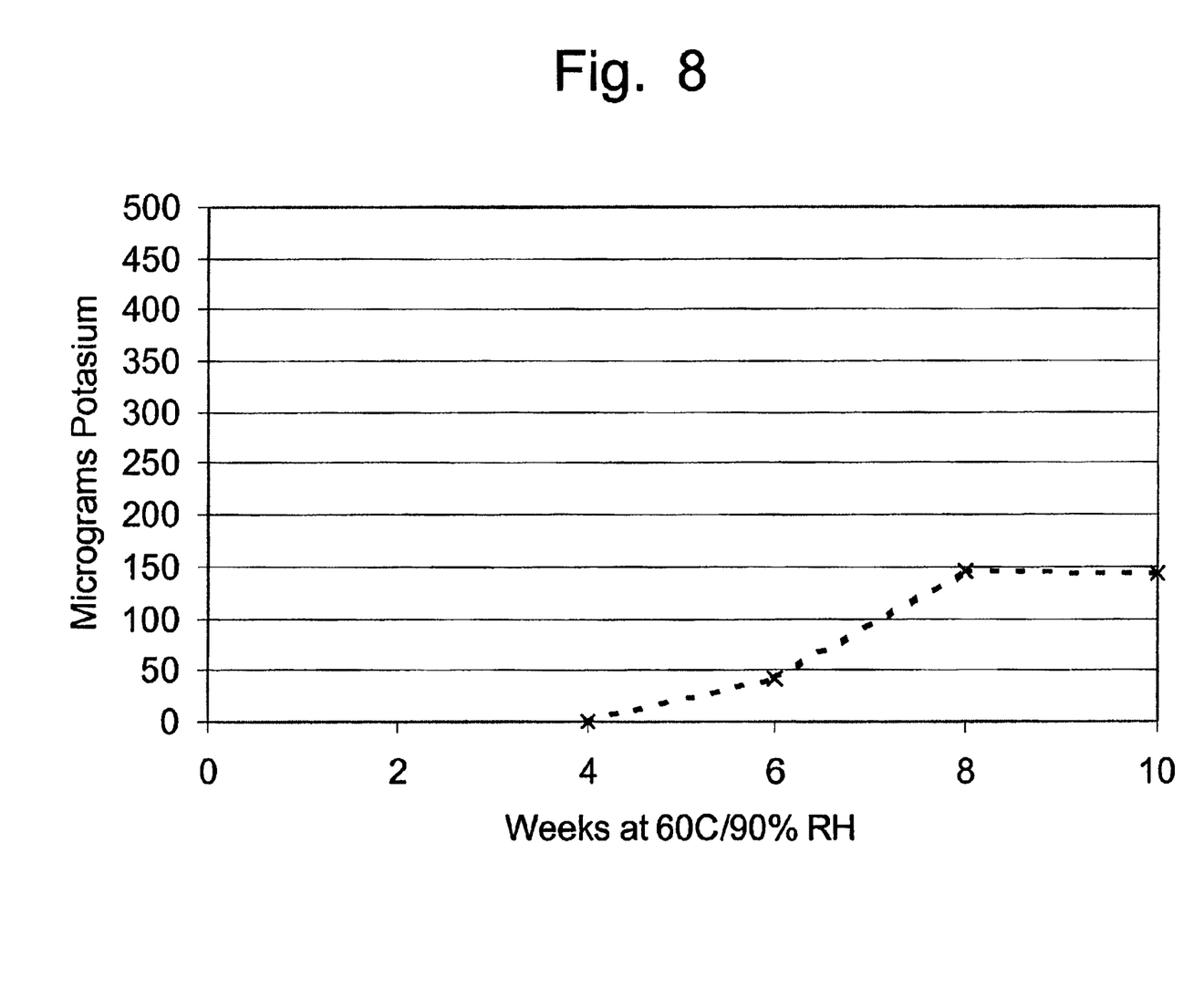
FIG. 8 is a graph of average potassium creepage from cells as a function of time on test.

Cells were made according to the invention in the same manner as the cells in Comparative Example 3, except that the seal members were injection molded from NORYL® Extend™7110. They were tested in the same manner as the cells in Comparative Example 3. The results are shown in FIG. 8. After 4 weeks on test there was no measurable potassium creepage from the cells, after 6 weeks the average was about 43 µg/cell, and at 10 weeks there was an average of 143 µg/cell. Cells with the unsupported hub seal member design shown in FIG. 3 were unacceptable for consumer use, due to failure of the seal members, when the seal members were made with nylon 6,6, but when the seal members were made with material according to the invention, they performed well. The use of the material of the invention makes possible the use of alternative seal member designs that would not be practical when made from nylon.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising a metal container with an open end; a negative electrode, a positive electrode and an electrolyte disposed within the container; and a seal member disposed in the open end of the container for closing the cell, thereby sealing the electrodes and the electrolyte within the container; wherein the seal member comprises an injection-molded thermoplastic material, the thermoplastic material comprising a mixture of:
   a polypropylene matrix comprising more than 30 weight percent of the thermoplastic material; and
   an aromatic polymer, the aromatic polymer comprising at least one polymer selected from the group consisting of poly(phenylene oxides) and polystyrenes.

2. The electrochemical cell as defined in claim 1, wherein the aromatic polymer comprises discrete phases in the polypropylene matrix.

3. The electrochemical cell as defined in claim 1, wherein the aromatic polymer is a poly(phenylene oxide).

4. The electrochemical cell as defined in claim 1, wherein the aromatic polymer comprises an impact modifier.

5. The electrochemical cell as defined in claim 4, wherein the impact modified aromatic polymer comprises discrete phases in the polypropylene matrix.

6. The electrochemical cell as defined in claim 4, wherein the impact modifier is a styrene/polyolefin block copolymer.

7. The electrochemical cell as defined in claim 1, wherein the thermoplastic material further comprises a compatibilizer.

8. The electrochemical cell as defined in claim 7, wherein the compatibilizer comprises a block copolymer having at least one block, wherein a first block end is soluble in the polypropylene and a second block end is soluble in the aromatic polymer.

9. The electrochemical cell as defined in claim 1, wherein the polypropylene comprises no more than 95 weight percent of the thermoplastic material.

10. The electrochemical cell as defined in claim 1, wherein the polypropylene comprises at least 40 weight percent of the thermoplastic material.

11. The electrochemical cell as defined in claim 10, wherein the aromatic polymer comprises polystyrene and the polypropylene comprises at least 50 weight percent of the thermoplastic material.

12. The electrochemical cell as defined in claim 10, wherein the aromatic polymer comprises poly(phenylene oxide).

13. The electrochemical cell as defined in claim 1, wherein the seal material is made from a mixture of polypropylene and poly(phenylene oxide).

14. The electrochemical cell as defined in claim 1, wherein the electrolyte is an alkaline aqueous solution.

15. The electrochemical cell as defined in claim 14, wherein the negative electrode comprises zinc, the positive electrode comprises manganese dioxide, and the electrolyte comprises a potassium hydroxide.

16. The electrochemical cell as defined in claim 1, wherein:
the cell further comprises a cover, a current collector and a contact terminal;
the cover is disposed in the open end of the container;
the current collector is electrically connected to one of the electrodes and extends through an aperture in the seal member so as to be electrically connected to the contact terminal;
the seal member forms a compressive seal between the container and the cover, and the seal member comprises a hub that forms a compressive seal around the current collector.

17. The electrochemical cell as defined in claim 16, wherein the hub is not compressed between the cover and the current collector.

18. The electrochemical cell as defined in claim 1, wherein the thermoplastic material has a tensile creep deformation, between 1 and 1000 hours at 114° F. under a constant load of 1500 psi, of 0 to 3 percent, as determined by ASTM D2990.

19. The electrochemical cell as defined in claim 18, wherein the thermoplastic material has a tensile modulus of 100,000 to 400,000 psi, as determined by ASTM D638.

20. The electrochemical cell as defined in claim 19, wherein the thermoplastic material has a tensile modulus of 100,000 to 250,000 psi.

21. The electrochemical cell as defined in claim 1, wherein the thermoplastic material has a coefficient of thermal expansion in the direction of flow of 0.000010 to 0.00020 in/in-° F. at 50% RH and 73° F., as determined by ASTM E831.

22. The electrochemical cell as defined in claim 18, wherein the thermoplastic material has a heat deflection temperature at 66 psi of 200° F. to 400° F., as determined by ASTM D648.

23. The electrochemical cell as defined in claim 22, wherein the thermoplastic material has a heat deflection temperature at 66 psi of 230° F. to 400° F.

24. The electrochemical cell as defined in claim 1, wherein the seal member further comprises a pressure relief mechanism that ruptures to release internal pressure from the cell and the thermoplastic material has a tensile elongation to break of 20–350 percent, as determined by ASTM D638.

25. The electrochemical cell as defined in claim 1, wherein the thermoplastic material has a heat deflection temperature at 66 psi of 200° F. to 400° F., as determined by ASTM D648.

26. The electrochemical cell as defined in claim 25, wherein the thermoplastic material has a tensile creep deformation, between 1 and 1000 hours at 114° F. under a constant load of 1500 psi, of 0 to 3 percent, as determined by ASTM D2990.

27. The electrochemical cell as defined in claim 26, wherein the thermoplastic material has a tensile modulus of 100,000 to 400,000 psi, as determined by ASTM D638.

28. A seal member for an electrochemical cell, wherein the seal member is capable of forming a compressive seal and comprises an injection molded thermoplastic material comprising a mixture of:
a polypropylene matrix comprising more than 30 weight percent of the thermoplastic material; and
an aromatic polymer, the aromatic polymer comprising at least one polymer selected from the group consisting of poly(phenylene oxides) and polystyrenes.

29. The seal member as defined in claim 28, wherein:
the thermoplastic material has a heat deflection temperature at 66 psi of 200° F. to 400° F., as determined by ASTM D648;
the thermoplastic material has a tensile creep deformation, between 1 and 1000 hours at 114° F. under a constant load of 1500 psi, of less than 3 percent, as determined by ASTM D2990; and
the thermoplastic material has a tensile modulus of 100,000 to 400,000 psi, as determined by ASTM D638.

30. The seal member as defined in claim 28, wherein the aromatic polymer is poly(phenylene oxide).

31. The seal member as defined in claim 30, wherein the aromatic polymer further comprises an impact modifier and the thermoplastic material further comprises a compatibilizer.

32. An electrochemical cell comprising a metal container and an injection-molded thermoplastic seal member forming a compressive seal, wherein the seal member has:
a tensile creep deformation, between 1 and 1000 hours at 114° F. under a constant load of 1500 psi, of 0 to 3 percent, as determined by ASTM D2990;
a tensile modulus at 50% RH and 23° C. of 120.000 to 300,000 psi, as determined by ASTM D638;
a coefficient of thermal expansion in the direction of flow at 50% RH and 73° F. of 0.000020 to 0.000060 in./in.-° F., as determined by ASTM E831; and
a heat deflection temperature, dry as molded, at 66 psi of 230° F. to 400° F., as determined by ASTM D648.

33. The electrochemical cell as defined in claim 32, wherein the seal member comprises a pressure relief mechanism and has a tensile elongation to break of 30 to 200 percent, as determined by ASTM D638.

34. The electrochemical cell as defined in claim 33, wherein the seal member is made from a mixture comprising:

more than 30 weight percent polyolefin, the polyolefin comprising at least one polymer selected from the group consisting of a polypropylene, a polyethylene, and a polypropylene-ethylene copolymer; and an aromatic polymer, the aromatic polymer comprising at least one polymer selected from the group consisting of poly(phenylene oxides) and polystyrenes.

35. The electrochemical cell as defined in claim 1, wherein the thermoplastic material has a tensile creep deformation, between 1 and 1000 hours at 114° F. under a constant load of 1500 psi, of 0 to 3 percent.

36. The electrochemical cell as defined in claim 35, wherein the thermoplastic material has a tensile modulus of 100,000 to 400,000 psi.

37. The electrochemical cell as defined in claim 36, wherein the thermoplastic material has a tensile modulus of 100,000 to 250,000 psi.

38. The electrochemical cell as defined in claim 1, wherein the thermoplastic material has a coefficient of thermal expansion in the direction of flow of 0.000010 to 0.00020 in/in-° F. at 50% RH and 73° F.

39. The electrochemical cell as defined in claim 35, wherein the thermoplastic material has a heat deflection temperature at 66 psi of 200° F. to 400° F.

40. The electrochemical cell as defined in claim 39, wherein the thermoplastic material has a heat deflection temperature at 66 psi of 230° F. to 400° F.

41. The electrochemical cell as defined in claim 1, wherein the seal member further comprises a pressure relief mechanism that ruptures to release internal pressure from the cell and the thermoplastic material has a tensile elongation to break of 20–350 percent.

42. The electrochemical cell as defined in claim 1, wherein the thermoplastic material has a heat deflection temperature at 66 psi of 200° F. to 400° F.

43. The seal member as defined in claim 28, wherein:

the thermoplastic material has a heat deflection temperature at 66 psi of 200° F. to 400° F.;

the thermoplastic material has a tensile creep deformation, between 1 and 1000 hours at 114° F. under a constant load of 1500 psi, of less than 3 percent; and the thermoplastic material has a tensile modulus of 100,000 to 400,000 psi.

44. The seal member as defined in claim 43, wherein the aromatic polymer is poly(phenylene oxide).

45. The seal member as defined in claim 44, wherein the aromatic polymer further comprises an impact modifier and the thermoplastic material further comprises a compatibilizer.

46. An electrochemical cell comprising a metal container and an injection-molded thermoplastic seal member forming a compressive seal, wherein the seal member has:

a tensile creep deformation, between 1 and 1000 hours at 114° F. under a constant load of 1500 psi, of 0 to 3 percent;

a tensile modulus at 50% RH and 23° C. of 120,000 to 300,000 psi;

a coefficient of thermal expansion in the direction of flow at 50% RH and 73° F. of 0.000020 to 0.000060 in./in.-° F.; and a heat deflection temperature, dry as molded, at 66 psi of 230° F. to 400° F.

47. The electrochemical cell as defined in claim 46, wherein the seal member comprises a pressure relief mechanism and has a tensile elongation to break of 30 to 200 percent.

48. The electrochemical cell as defined in claim 47, wherein the seal member is made from a mixture comprising:

more than 30 weight percent polyolefin, the polyolefin comprising at least one polymer selected from the group consisting of a polypropylene, a polyethylene, and a polypropylene-ethylene copolymer; and an aromatic polymer, the aromatic polymer comprising at least one polymer selected from the group consisting of poly(phenylene oxides) and polystyrenes.

* * * * *